United States Patent [19]
Haberstroh

[11] Patent Number: 5,931,246
[45] Date of Patent: Aug. 3, 1999

[54] AUTOMOBILE WITH A BODY SUPPORT STRUCTURE AND METHOD OF MANUFACTURING SAME

[75] Inventor: Rudolf Haberstroh, Stuttgart, Germany

[73] Assignee: Daimler-Benz AG, Stuttgart, Germany

[21] Appl. No.: 08/959,458

[22] Filed: Oct. 27, 1997

[30] Foreign Application Priority Data

Oct. 26, 1996 [DE] Germany .................. 196 44 531

[51] Int. Cl.$^6$ ............................................. B62D 23/00
[52] U.S. Cl. ................................. 180/89.1; 296/191
[58] Field of Search ................. 180/89.1; 289/785; 296/191, 193, 194, 195, 203.02, 203.04

[56] References Cited

U.S. PATENT DOCUMENTS

| 4,705,716 | 11/1987 | Tang ............................. 296/191 X |
| 5,688,021 | 11/1997 | Tomforde et al. ................. 296/185 |
| 5,702,779 | 12/1997 | Siebelink, Jr. et al. ........... 296/191 X |

FOREIGN PATENT DOCUMENTS

| 2369140 | 5/1978 | France . |
| 2687974A1 | 9/1993 | France . |
| 2414157 | 10/1975 | Germany ............................ 296/191 |
| 2923874A1 | 1/1981 | Germany . |
| 3035333A1 | 5/1982 | Germany . |
| 4240822C1 | 4/1994 | Germany . |
| 374854 | 9/1939 | Italy ................................. 296/191 |
| 570814 | 7/1945 | United Kingdom . |

OTHER PUBLICATIONS

VDI–Berichte, Nr. 968, May 1992, pp. 257–278; 307–332.
Gloor, R.: Zukunftsautos der 80er Jahre, pp. 341–342; 382–384; Vera, Vera 02, Vestaq, edsta 02, Hellwag Verlag Bern, Mar. 1991.
Search Report, Feb. 13, 1998, Europe.

Primary Examiner—Christopher P. Ellis
Attorney, Agent, or Firm—Evenson McKeown Edwards & Lenahan, PLLC

[57] ABSTRACT

A self-supporting body for an automobile with mixed construction is disclosed with an area of the body support structure associated with a set area for an engine assembly and other heavy vehicle assemblies, as well as the body parts of the body cladding surrounding this area are made asymmetric with respect to the longitudinal center of gravity of the vehicle and at least partially of a material whose weight is reduced by comparison with the rest of the body support structure and with respect to the rest of the body cladding.

5 Claims, 1 Drawing Sheet

AUTOMOBILE WITH A BODY SUPPORT STRUCTURE AND METHOD OF MANUFACTURING SAME

BACKGROUND AND SUMMARY OF THE INVENTION

This application claims the priority of German application 196 44 531.0-21 filed in Germany on Oct. 26, 1996, the disclosure of which is expressly incorporated by reference herein.

The invention relates to an automobile with a body support structure having a front area and a rear area, as well as with a body cladding connected with the body support structure, with the body support structure having in the front area a set area to receive a drive assembly as well as associated functional units.

In automobiles, it is known (VDI-Berichte 968 "Entwicklungen im Karosseriebau" [Developments in Body Construction], VDI-Verlag, Düsseldorf, 1992) to make the self-supporting body not exclusively of steel but of a mixed construction. In this mixed construction, the body support structure is made of sheet steel and the body cladding is made of aluminum sheet. This results in a weight reduction for the automobile that produces an improvement in driving dynamics as well as a reduction of fuel consumption. Mixed construction however can lead to unfavorable axle load distribution which must be compensated by additional design measures.

A goal of the invention is to produce an automobile of the species recited at the outset that has a weight that has been reduced relative to known sheet steel designs and nevertheless has a favorable axle load distribution.

This goal is achieved by virtue of the fact that a portion of the body support structure associated with the front area, especially the set area, or the rear area, as well as the body parts of the body cladding surrounding this section asymmetrically with respect to the center of gravity of the vehicle are made at least partially of a material with reduced weight relative to the rest of the body support structure and relative to the rest of the body cladding. The solution according to the invention takes its departure from the fact that the lightweight measures pertain only to the self-supporting body and not to the drive assembly itself. With a symmetrical arrangement of the lightweight elements over the length of the body, because of the still-high weight of the drive assembly at the wheel axis adjacent to the drive assembly, a high axle load would result that would lead to poor driving dynamics, especially to poor traction.

A different distribution of the axle load such as shifting the battery to the vicinity of the other wheel axis would result in a certain degree of compensation but at the same time it would reduce the useful space inside the vehicle body. Firstly, the battery would require additional space for installation in the vicinity of the other wheel axis and secondly the remote location of the battery from the associated functional units would require longer cable and connector pathways that would also take up additional space.

The solution according to the invention takes a completely different approach that does not provide symmetrical but rather asymmetrical distribution of the lightweight structural elements, especially in the body area that has a high weight because of the drive assembly. Since conventional sheet steel construction is retained in the remaining areas of the body, balanced and optimized axle load distribution is achieved even without additional axle load distribution measures. In the vicinity of the wheel axis where the heavy drive assembly is located, the body is made with a lightweight design while the conventional design is retained in the vicinity of the other wheel axis. As a result, weight reduction is obtained that is not as great as with symmetrical mixed construction, but this disadvantage is more than compensated by the automatically favorable axle load distribution as well as the fact that the installation space required does not have to be reduced and also by the reduction in costs due to lower expenditure.

The solution according to preferred embodiments of the invention described above applies in particular to an automobile with a front mounted engine and a rear wheel drive. The solution according to the invention can also be advantageously used for automobiles with rear engines or for automobiles with a front mounted engine and front wheel drive according to other contemplated preferred embodiments. In an automobile with a front mounted engine and front wheel drive, locating the weight-reducing parts in the rear improves the traction of the vehicle.

In the design of the invention, the area of the body structure associated with the set area as well as the body parts surrounding this area are made of a lightweight material, especially aluminum, and the remaining body support structure and body cladding are made of steel. The use of aluminum is especially beneficial in view of the advantageous ways in which the material can be worked.

In another embodiment of the invention, chassis parts, especially a wheel axle, are made of lightweight material in the vicinity of the set area. This creates another possibility for saving weight in the set area. This design is advantageous if the measures already described for weight reduction of the body in the vicinity of the set area are insufficient for uniform axle load distribution on the front and rear axles.

Other objects, advantages and novel features of the present invention will become apparent from the following detailed description of the invention when considered in conjunction with the accompanying drawings.

DETAILED DESCRIPTION OF THE DRAWINGS

Figure 1:
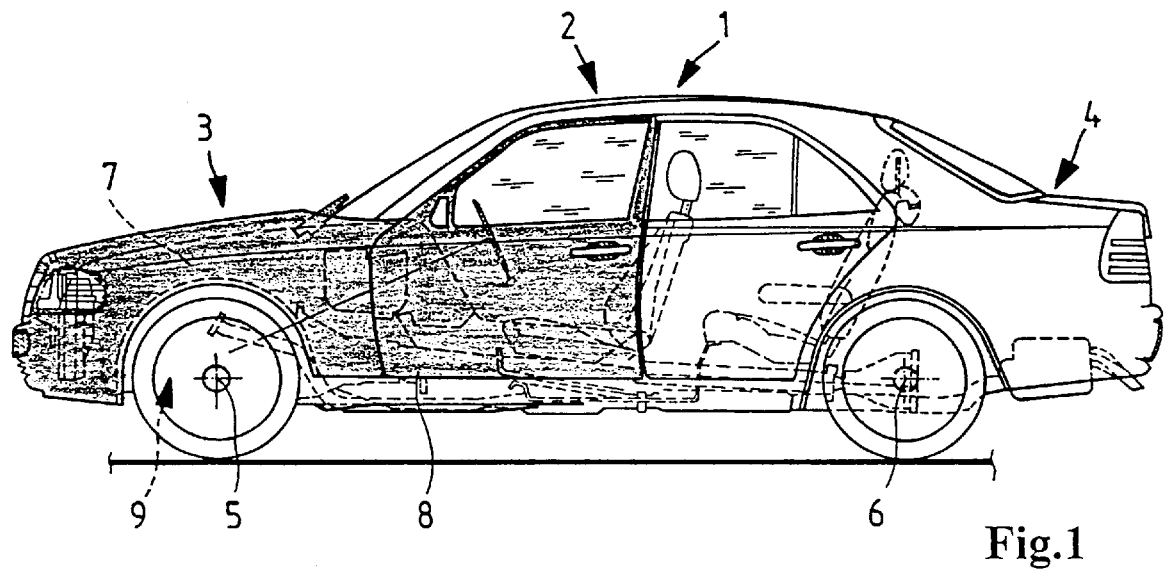
FIG. 1 is a schematic side view of one embodiment of an automobile according to the invention whose front body part is made with lightweight construction.
Figure 2:
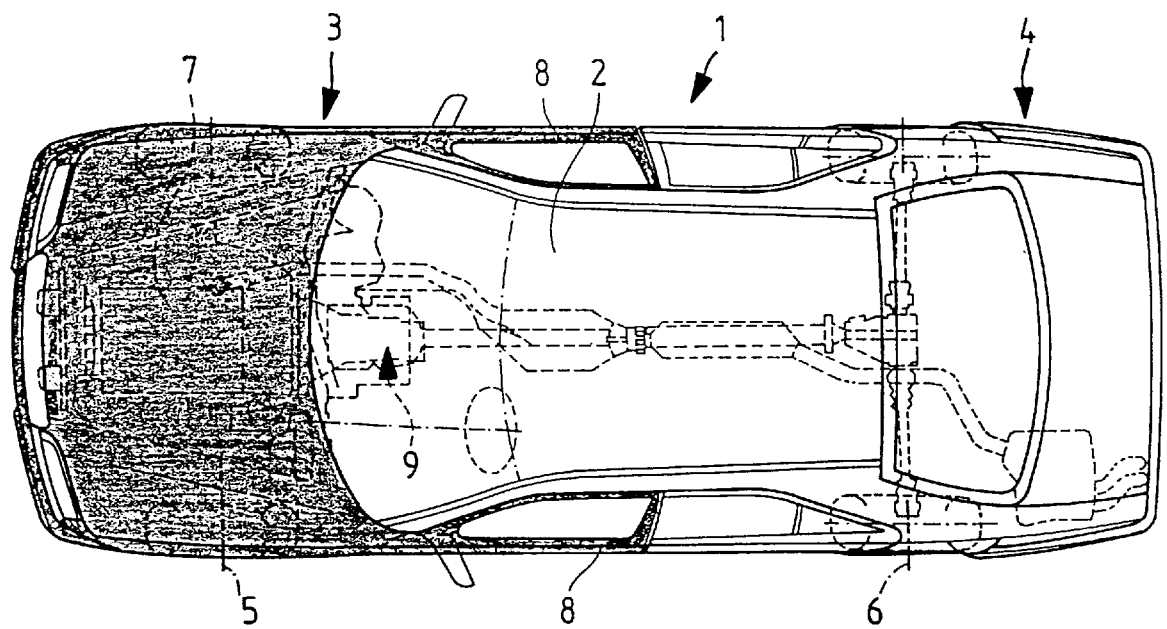
FIG. 2 is a top view of the automobile shown in FIG. 1.

An automobile 1 shown in FIGS. 1 and 2 has a self-supporting vehicle body that is divided into a front area 3, a passenger compartment 2, and a rear area 4. The vehicle body is made of a body support structure as well as a body cladding that is connected to the body support structure. In front area 3 the body support structure is formed in particular of lengthwise and cross members. Body cladding parts include in particular the front fenders on the sides as well as the hood. In the vicinity of passenger compartment 2, the body support structure has a floor composed in particular of a plurality of lengthwise and cross members as well as supporting columns that are lateral and project upward, said columns being connected to one another by roof frame parts in a roof area. To provide body cladding for passenger compartment 2, the front and rear side doors are included in addition to the roof. Rear area 4 has lengthwise and cross members that are part of the body support structure. The body cladding in rear area 4, in addition to the trunk lid, also includes the sides of the rear fenders.

Automobile 1 in front area 3 has a front wheel axle arrangement 5 and a rear wheel axle arrangement between passenger compartment 2 and rear area 4. In front area 3 and hence in the vicinity of front wheel axle arrangement 5, a drive assembly 9 is located whose driving force is transmitted through a drive shaft to rear wheel axle arrangement 6. Set area 7 in which the drive assembly is located is closed off from passenger compartment 2 by an end wall that is part of the body support structure. Set area 7 contains, in addition to drive assembly 9, additional functional units, especially a battery to supply electricity to the various electrical functional units in automobile 1.

Since a relatively high axle load is imposed on front wheel axle arrangement 5 because of the high weight of drive assembly 9 including the additional functional units, especially the battery, both the body support structure and the corresponding body cladding have their weight reduced in this area, and are made at least partially of a lightweight structural material, namely aluminum. In the embodiment shown, the front lengthwise and cross members as well as the end wall of the body support structure are made of aluminum. The supporting parts of front wheel axle arrangement 5 are also made of aluminum. In addition, the body parts of the body cladding located in the vicinity of set area 7 are made of aluminum sheet, namely the side of the front fenders and the front hood.

In addition, front side doors 8 are also made of a lightweight material namely aluminum. Thus, large-volume parts of the body support structure in particular and the body cladding in a front vehicle area in front of a central transverse axis of the vehicle located approximately at the B pillars of passenger compartment 2 is made of a lightweight material. On the other hand, the parts of the body support structure located behind the central transverse axis of the vehicle and the body cladding, in other words, the parts in the rear area of passenger compartment 2 as well as in rear area 4, are made of sheet steel construction. The distribution of the lightweight parts of the body support structure and the body cladding is therefore asymmetric with respect to the center of gravity of the vehicle, with only the front vehicle area, which already must support a higher axle load because of drive assembly 9, having its weight reduced by using lightweight structural components. The higher weight in the vicinity of front wheel axle arrangement 5, caused by drive assembly 9 as well as the associated functional units in set area 7, is therefore compensated, by using lightweight structural components for the vehicle body, so that a balanced and uniform axle load distribution is obtained at both wheel axle arrangements 5 and 6. Since no drive assembly is provided in the vicinity of rear wheel axle arrangement 6, the vehicle body can be made with conventional steel construction at this point, so that the weight increase due to drive assembly 9 is compensated at front wheel axle arrangement 5. According to the invention, the other functional units of drive assembly 9 are arranged compactly in set area 7 so that short conducting and cable pathways result for the corresponding connections. In the vicinity of rear wheel axle arrangement 6, there is no need to provide additional installation space for incorporating measures to compensate different axle loads.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Automobile with a body support structure having a front area and a rear area and with a body cladding connected with the body support structure, with the body support structure having a set area in the front area for receiving a drive assembly and corresponding functional units, wherein a portion of the body support structure associated with the set area as well as body parts of the body cladding surrounding this area are made asymmetric relative to the longitudinal center of gravity of the vehicle and at least partially of a material with reduced weight with respect to the rest of the body support structure and with respect to the rest of the body cladding.

2. Automobile according to claim 1, wherein the area of the body support structure associated with the set area as well as the body parts surrounding this area are made of aluminum and the remaining body support structure and body cladding are made of steel.

3. Automobile according to claim 2, wherein chassis parts, especially a wheel axle in a vicinity of the set area, are made of lightweight material.

4. An Automobile comprising:

front body support structure disposed to support a vehicle engine assembly, rear body support structure disposed to support a vehicle rear wheel assembly, front exterior cladding connected with and adjacent to the front body support structure, and rear exterior cladding connected with and adjacent to the rear body support structure, wherein a vehicle longitudinal center of gravity is disposed at a first position along a length of the automobile, and wherein the front body support structure and front exterior cladding is disposed asymmetrically with respect to the longitudinal center of gravity and is constructed at least partially of material with reduced weight with respect to remaining body support structure and exterior cladding, whereby the different weight materials of the body support structure and cladding along the length of the automobile accommodate for the asymmetric arrangement of the weight distribution of vehicle components, including a vehicle engine assembly and a vehicle rear wheel assembly.

5. A method of manufacturing an automobile comprising:

providing a front body support structure disposed to support a vehicle engine assembly, providing a rear body support structure disposed to support a vehicle rear wheel assembly, providing a front exterior cladding connected with and adjacent to the front body support structure, and providing a rear exterior cladding connected with and adjacent to the rear body support structure, wherein a vehicle longitudinal center of gravity is disposed at a first position along a length of the automobile, and wherein the front body support structure and front exterior cladding is disposed asymmetrically with respect to the longitudinal center of gravity and is constructed at least partially of material with reduced weight with respect to remaining body support structure and exterior cladding, whereby the different weight materials of the body support structure and cladding along the length of the automobile accommodate for the asymmetric arrangement of the weight distribution of vehicle components, including a vehicle engine assembly and a vehicle rear wheel assembly.

* * * * *